US012725597B2

(12) United States Patent
Suzuki et al.

(10) Patent No.: US 12,725,597 B2
(45) Date of Patent: Sep. 1, 2026

(54) SOUND ABSORBING DEVICE FOR MOVING BODY

(71) Applicant: HONDA MOTOR CO., LTD., Tokyo (JP)

(72) Inventors: Shunji Suzuki, Wako (JP); Hayato Kojima, Wako (JP); Yuma Tsuboi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 342 days.

(21) Appl. No.: 18/235,369

(22) Filed: Aug. 18, 2023

(65) Prior Publication Data

US 2024/0071354 A1 Feb. 29, 2024

(30) Foreign Application Priority Data

Aug. 31, 2022 (JP) ................................ 2022-138065

(51) Int. Cl.
*G10K 11/172* (2006.01)

(52) U.S. Cl.
CPC .................................. *G10K 11/172* (2013.01)

(58) Field of Classification Search
CPC .... G10K 11/172; G10K 11/175; B60R 13/08; B64C 1/40
USPC .................................................. 181/207, 229
See application file for complete search history.

(56) References Cited

U.S. PATENT DOCUMENTS 5,702,230 A * 12/1997 Kraft ....................... F02K 1/827 381/71.7
5,731,552 A * 3/1998 Tsao ..................... H04R 1/2834 181/146
6,075,308 A * 6/2000 Date ...................... G10K 11/16 310/314
7,464,790 B2 * 12/2008 Kodama ............. G10K 11/172 181/290
7,506,626 B2 * 3/2009 Sasaki ................ F02M 35/1294 123/184.53
8,616,330 B1 * 12/2013 McKnight ............... B60R 13/08 181/207
9,711,129 B2 * 7/2017 Sheng .................. G10K 11/162
12,211,476 B2 * 1/2025 Ishii ........................ F16F 15/06

(Continued)

FOREIGN PATENT DOCUMENTS

JP 11-153995 6/1999
JP 2009-040153 2/2009

(Continued)

OTHER PUBLICATIONS

Japanese Notice of Allowance for Japanese Patent Application No. 2022-138065 dated May 21, 2024.

*Primary Examiner* — Jeremy A Luks

(74) *Attorney, Agent, or Firm* — Amin, Turocy & Watson, LLP

(57) ABSTRACT

A sound absorbing device for a moving body includes a resonance tube, a variable elastic membrane, and an adjustment part. The resonance tube has a pipeline, one end portion of which is disposed to face an indoor space. The variable elastic membrane has one surface disposed so as to face an indoor space and the other surface disposed so as to face an internal space of other end portion of the resonance tube. The adjustment part adjusts an elastic modulus of the variable elastic membrane.

8 Claims, 8 Drawing Sheets

(56) References Cited

U.S. PATENT DOCUMENTS

| | | | | |
|---|---|---|---|---|
| 2007/0044747 | A1* | 3/2007 | Sawatari | F02M 35/1261 123/184.53 |
| 2007/0161918 | A1* | 7/2007 | Ganshorn | A61B 5/085 600/533 |
| 2009/0205901 | A1 | 8/2009 | Tanase et al. | |
| 2015/0146895 | A1* | 5/2015 | Gerlach | H04R 17/00 381/190 |
| 2020/0265822 | A1* | 8/2020 | Egan | G10K 11/161 |

FOREIGN PATENT DOCUMENTS

| | | |
|---|---|---|
| JP | 2009-102000 | 5/2009 |
| JP | 2009-255908 | 11/2009 |
| JP | 2023-124503 | 9/2023 |

* cited by examiner

SOUND ABSORBING DEVICE FOR MOVING BODY

CROSS-REFERENCE TO RELATED APPLICATION

Priority is claimed on Japanese Patent Application No. 2022-138065, filed Aug. 31, 2022, the contents of which are incorporated herein by reference.

BACKGROUND OF THE INVENTION

Field of the Invention

The present invention relates to a sound absorbing device for a moving body configured to absorb noise in an indoor space of a moving body such as a vehicle, an airplane, or the like.

Description of Related Art

Rotational vibrations of an engine, traveling vibrations, or the like may be transmitted as noise to the inside of a moving body such as a vehicle, an airplane, or the like. As countermeasures against this kind of noise, various proposals have been made, such as a resonator type sound absorbing device using a resonance tube or a resonance box, a plate vibration type sound absorbing device using a thin plate or membrane, and the like (for example, see Japanese Unexamined Patent Application, First Publication No. 2009-102000).

Japanese Unexamined Patent Application, First Publication No. 2009-102000 discloses a side branch type sound absorbing device using a resonance tube capable of adjusting a pipeline length. In the resonance tube of the sound absorbing device, one end portion of a pipeline is disposed to face an indoor space, and a movable bottom surface is provided on the side of the other end portion of the pipeline. In the sound absorbing device, the noise in the indoor space is attenuated by the air in the resonance tube resonated with sound of a frequency (wavelength) according to a pipeline length and the interference between the resonant vibration of the air inside the resonance tube and the noise vibration in the indoor space.

SUMMARY OF THE INVENTION

However, in the side branch type sound absorbing device disclosed in Japanese Unexamined Patent Application, First Publication No. 2009-102000, when the interior sound in the low frequency range that is a target is intended to be reduced, there is no choice but to lengthen the pipeline length of the resonance tube. For this reason, in such a sound absorbing device, the entire sound absorbing device tends to be large and heavy, and improvement in this point is desired.

In addition, in the plate vibration type sound absorbing device using the thin plate or the membrane, if the vibration plate is intended to be sufficiently vibrated when a sound pressure of the noise in the indoor space is received, there is no choice but to increase an area of the vibration plate. For this reason, in such a sound absorbing device, an installation area of the vibration plate becomes large, and as a result, the entire sound absorbing device becomes large and heavy.

An aspect of the present invention provides a sound absorbing device for a moving body capable of efficiently absorbing noise in an indoor space without causing an increase in size and weight of the device.

A sound absorbing device for a moving body according to an aspect of the present invention includes a resonance tube (for example, a resonance tube (11) of an embodiment), in which one end portion (for example, one end portion (12*a*) of the embodiment) of a pipeline (for example, a pipeline (12) of the embodiment) is disposed to face an indoor space (for example, an indoor space (10) of the embodiment); a variable elastic membrane (for example, a variable elastic membrane (13) of the embodiment) in which one surface (for example, a front surface (13*a*) of the embodiment) is disposed so as to face the indoor space and in which other surface (for example, a back surface (13*b*) of the embodiment) is disposed so as to face an internal space of other end portion (for example, the other end portion (12*b*) of the embodiment) of the resonance tube; and an adjustment part (for example, a voltage adjustment part (30) of the embodiment) configured to adjust an elastic modulus of the variable elastic membrane.

According to the above-mentioned configuration, in the resonance tube, when the elastic modulus of the variable elastic membrane of the other end portion is set to an arbitrary value, an air column in the resonance tube resonates with the noise in the predetermined frequency range of the indoor space. The resonance tube attenuates (consumes) energy of the noise in the indoor space as the resonant vibration interferes with the noise of the predetermined frequency range of the indoor space. In addition, the variable elastic membrane vibrates by receiving the noise vibration of the indoor space, and attenuates (consumes) energy of the noise in the indoor space due to internal friction of the variable elastic membrane according to the vibration. In addition, by appropriately setting the pipeline length or the like of the resonance tube, a pressure phase of the noise vibration directly received from the indoor space by the variable elastic membrane and a pressure phase of the noise vibration received on a back surface of the variable elastic membrane (a surface opposite to the side facing the indoor space) through the resonance tube can be set as opposite phases. When the pressure phases of the vibrations applied to the front and the rear of the variable elastic membrane in this way are opposite phases, amplitude of the variable elastic membrane is increased or decreased, and thus energy of the noise in the indoor space is efficiently attenuated (consumed).

Here, the elastic modulus of the variable elastic membrane can be changed by the adjustment part. When the elastic modulus of the variable elastic membrane of the other end portion of the resonance tube is reduced by the adjustment part, a position of an antinode of the air column vibration in the resonance tube virtually extends to an outer side (a side of the indoor space) of an actual position of the other end portion of the resonance tube. As a result, it is possible to reduce the frequency of the attenuated noise in the indoor space. This means that if the noise frequency of the attenuating target is the same, the pipeline length of the resonance tube can be shortened. Accordingly, when this configuration is employed, the sound absorbing device can be made smaller and lighter by reducing the elastic modulus of the variable elastic membrane with the adjustment part.

The sound absorbing device for a moving body may further include a frequency detection part (for example, a frequency detection part (35) of the embodiment) configured to detect a frequency of noise, and the adjustment part may increase or decrease an elastic modulus of the variable elastic membrane according to the frequency of the noise detected by the frequency detection part.

In this case, depending on the frequency of the noise detected by the frequency detection part, the adjustment part increases or decreases the elastic modulus of the variable elastic membrane, making it possible to change the frequency range that can absorb sound. For this reason, when this configuration is employed, a wide frequency range of noise can be absorbed according to the generated noise.

The adjustment part may increase an elastic modulus of a variable elastic membrane as the frequency of the noise detected by the frequency detection part increases, and decrease the elastic modulus of the variable elastic membrane as the frequency of the noise detected by the frequency detection part decreases.

In this case, depending on the frequency of the noise detected by the frequency detection part, the elastic modulus of the variable elastic membrane can be set to the optimum elastic modulus that can absorb sound. For this reason, when this configuration is employed, a wide frequency range of noise can be accurately absorbed.

The variable elastic membrane may be formed of a material capable of adjusting a membrane thickness according to a stimulus from outside, and the adjustment part may be configured to apply a stimulus to the variable elastic membrane that increases or decreases a membrane thickness.

In this case, the adjustment part can appropriately set the elastic modulus of the variable elastic membrane by applying the stimulus that increases or decreases the membrane thickness, such as a voltage, an electric charge, or the like, to the variable elastic membrane. For this reason, when this configuration is employed, it is possible to appropriately absorb the noise of the frequency range of the sound-absorbing target.

The adjustment part may be constituted by an expansion/contraction device (for example, an expansion/contraction device (40) of the embodiment) configured to apply a force in an expansion/contraction direction which increases or decreases tension of the variable elastic membrane.

In this case, as the expansion/contraction device that is the adjustment part applies a force in the expansion/contraction direction in which tension is increased or decreased to the variable elastic membrane, the tension of the variable elastic membrane can be changed, and the elastic modulus of the variable elastic membrane can be appropriately set. For this reason, when this configuration is employed, it is possible to appropriately absorb the noise of the frequency range of the sound-absorbing target.

In addition, in the above-mentioned configuration, since the expansion/contraction device applies a physical force in the expansion/contraction direction to the variable elastic membrane, even if the variable elastic membrane is made of easily available and inexpensive materials, the elastic modulus of the variable elastic membrane can be increased or decreased appropriately. Accordingly, when this configuration is employed, it is possible to reduce product costs of the sound absorbing device.

The sound absorbing device for a moving body may include a plurality of the resonance tubes having different lengths, and the respective variable elastic membrane and the respective adjustment part corresponding to each of the resonance tubes may be provided.

In this case, by combining the resonance tubes with different lengths, it is possible to accurately absorb noise in various frequency ranges.

In the sound absorbing device for a moving body according to the aspect of the present invention, the amplitude of the variable elastic membrane can be amplified by a pressure difference between the pressure vibration directly received from the indoor space by the one surface of the variable elastic membrane and the pressure vibration of the opposite phase received by the other surface of the variable elastic membrane through the resonance tube. Further, the sound absorbing device for a moving body according to the present invention can reduce the noise in the low frequency range without increasing the pipeline length of the resonance tube by lowering the elastic modulus of the variable elastic membrane with the adjustment part. Accordingly, when the sound absorbing device for a moving body according to the aspect of the present invention is employed, the noise in the indoor space can be efficiently absorbed without increasing the size and weight of the device.

DETAILED DESCRIPTION OF THE INVENTION

Hereinafter, embodiments of the present invention will be described with reference to the accompanying drawings. Further, in the embodiments described below, the same reference signs are attached to common parts, and overlapping descriptions are partially omitted.

First Embodiment

Figure 1:
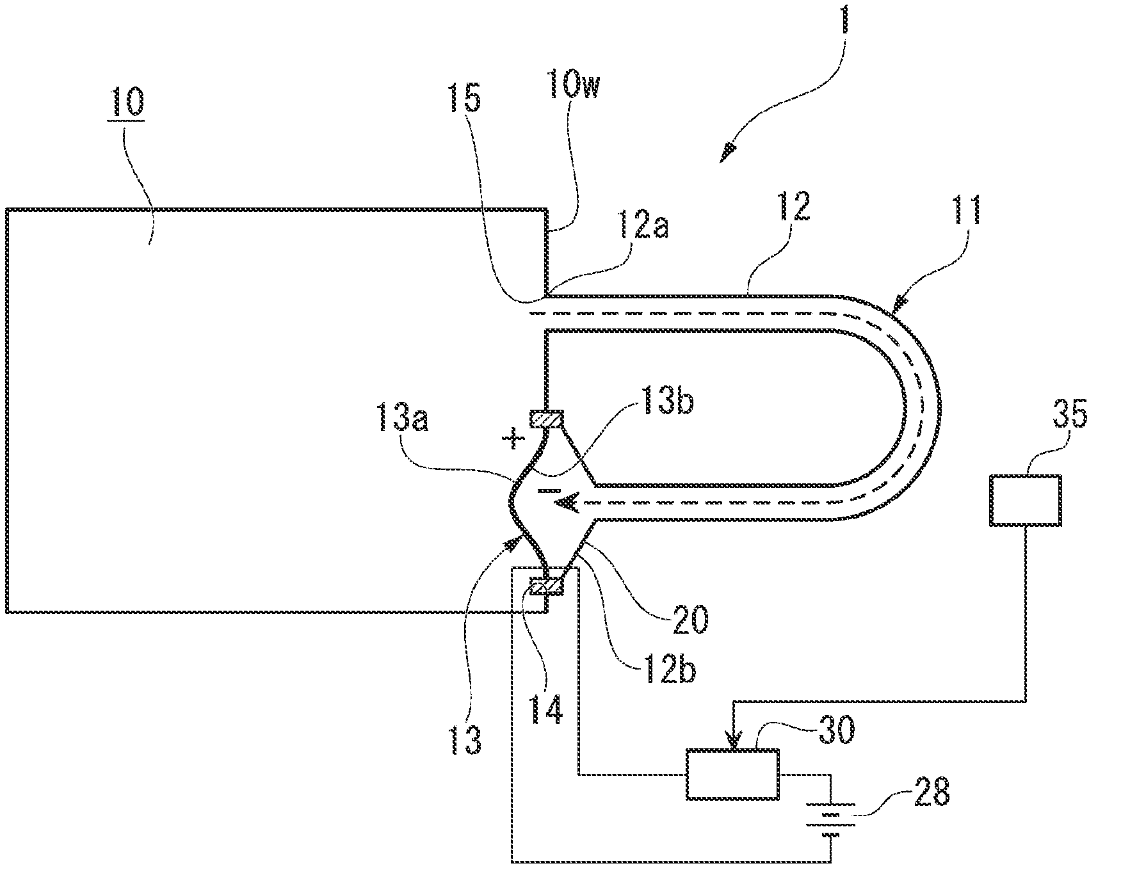
FIG. 1 is a schematic configuration view of a sound absorbing device of a first embodiment of the present invention.
Figure 2:
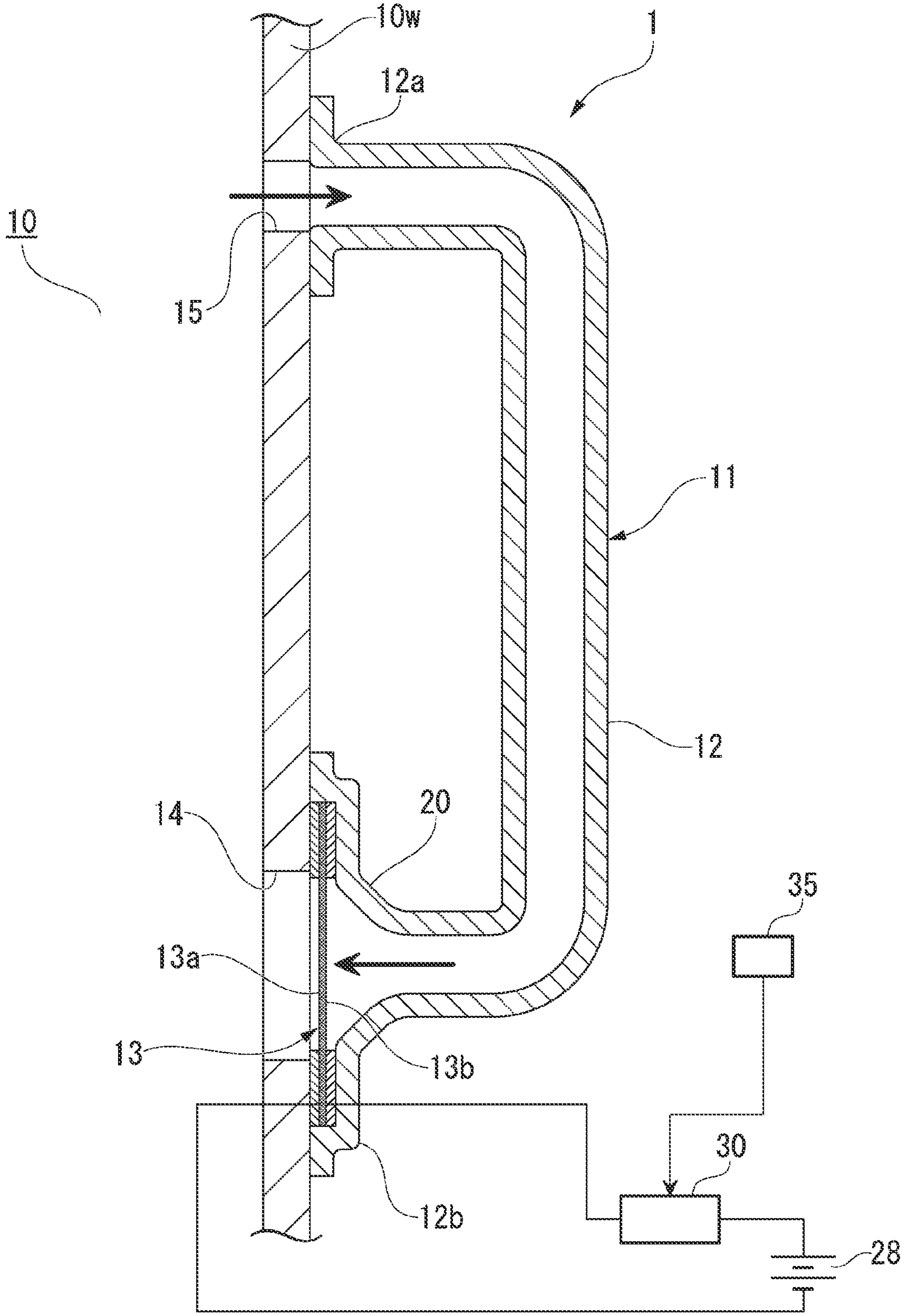
FIG. 2 is a cross-sectional view of the sound absorbing device of the first embodiment of the present invention.

FIG. 1 is a schematic configuration view of a sound absorbing device for a moving body 1 of an embodiment (hereinafter referred to as "the sound absorbing device 1"). FIG. 2 is a cross-sectional view of the sound absorbing device 1.

The sound absorbing device 1 of the embodiment is applied to a moving body such as an aircraft, a vehicle, or the like. The sound absorbing device 1 is disposed to partially face an indoor space 10 of the moving body. Specifically, for example, as shown in FIG. 1 and FIG. 2, the sound absorbing device 1 is installed on an arbitrary wall 10*w* in the interior that constitutes the indoor space 10. The sound absorbing device 1 includes a resonance tube 11 connected to the wall 10*w* of the interior such that one end portion 12*a* of a pipeline 12 faces the indoor space 10, and a variable elastic membrane 13 (a vibration membrane) installed on the wall 10*w* such that one surface 13*a* (hereinafter referred to as "a front surface 13*a*") faces the indoor space 10.

In the embodiment, the resonance tube 11 is disposed on an outer side of the wall 10*w*. However, the resonance tube 11 can also be disposed on an inner side of the wall 10*w* (on the side of the interior).

For example, as shown in FIG. 2, the variable elastic membrane 13 is attached to an outer side of a communication port 14 (an outer side of the vehicle) provided on the wall 10*w* of the indoor space 10. The communication port 14 is formed in a circular shape having the same size as an effective vibration area (an area of a portion that actually vibrates by receiving sound waves in the indoor space 10) of the variable elastic membrane 13.

The variable elastic membrane 13 is constituted by, for example, a piezoelectric film (polymer ferroelectric film), a piezoelectric ceramic (lead zirconate titanate), or the like. The variable elastic membrane 13 of the embodiment increases or decreases the elastic modulus of the membrane by applying a voltage to the electrode (reference sign omitted) disposed on the front surface 13*a* and a back surface 13*b*. In the embodiment, a power supply 28 and a voltage adjustment part 30 are serially connected to an electric circuit connected to the variable elastic membrane 13. The voltage adjustment part 30 receives a detection signal of a frequency detection part 35 configured to detect a frequency of noise in the indoor space 10, and outputs a voltage according to the detection signal to the variable elastic membrane 13.

Further, the frequency detection part 35 may be a device that directly detects a frequency of noise, or may be a device that indirectly detects a frequency of noise. For example, when main noise of the indoor space 10 is vibrations of an engine, a motor, or the like, which is a driving source of an aircraft or a vehicle, the frequency of the noise may be indirectly detected by measuring a rotation number of the driving source.

Specifically, the voltage adjustment part 30 increases the voltage applied to the variable elastic membrane 13 as the frequency of the noise detected by the frequency detection part 35 increases, and decreases the voltage applied to the variable elastic membrane 13 as the frequency of the noise detected by the frequency detection part 35 decreases. Accordingly, an elastic modulus of the variable elastic membrane 13 is increased according to an increase in frequency of the noise detected by the frequency detection part 35, and the elastic modulus of the variable elastic membrane 13 is decreased according to a decrease in frequency of the noise detected by the frequency detection part 35.

In addition, as shown in FIG. 2, another communication port 15 having an opening area smaller than that of the communication port 14 is provided in the wall 10*w* of the indoor space 10 at a position which is separated from the communication port 14 that faces the variable elastic membrane 13. The one end portion 12*a* of the pipeline 12 of the resonance tube 11 is connected to the communication port 15. The pipeline 12 of the resonance tube 11 extends in a direction separating away from the wall 10*w*, and then the pipeline 12 extends to be bent until a position which faces the communication port 14 in parallel with the wall 10*w*. The pipeline 12 of the resonance tube 11 further extends to be bent in a direction of the communication port 14 at a position facing the communication port 14. At the other end portion 12*b* of the pipeline 12, an opening area of the inside is gradually enlarged (gradually increased) in a direction of the communication port 14. Hereinafter, among a region of the other end portion 12*b* of the pipeline 12, an internal opening area of which is gradually increased, is referred to as "a tapered portion 20." The other end portion 12*b* of the pipeline 12 is connected to the wall 10*w* of the indoor space 10 while sandwiching the outer circumferential edge portion of the variable elastic membrane 13.

In the variable elastic membrane 13 fixed to the wall 10*w* of the indoor space 10 while being sandwiched by the other end portion 12*b* of the pipeline 12, a surface 13*b* opposite to a side facing the indoor space 10 (hereinafter, referred to as "the back surface 13*b*, the other surface 13*b*") faces an internal space of the other end portion 12*b* of the pipeline 12 of the resonance tube 11. Specifically, the back surface 13*b* of the variable elastic membrane 13 faces an internal space of the tapered portion 20 in the other end portion 12*b* of the pipeline 12. Further, a space between the back surface 13*b* of the variable elastic membrane 13 and the other end portion 12*b* of the pipeline 12 is closed.

Here, the resonance tube 11 of the sound absorbing device 1 resonates with the vibrations of the predetermined frequency range among the noise in the indoor space 10 input from the one end portion 12*a* of the pipeline 12. In addition, the noise vibration input into the pipeline 12 of the resonance tube 11 hits the back surface 13*b* of the variable elastic membrane 13 in the other end portion 12*b* of the pipeline 12. Here, by appropriately setting the pipeline length or the like of the resonance tube 11, a pressure phase of the noise vibration directly received from the indoor space 10 by the front surface 13*a* of the variable elastic membrane 13 and a pressure phase of the noise vibration received by the back surface 13*b* of the variable elastic membrane 13 through the resonance tube 11 can be set as opposite phases. Accordingly, the vibration pressures acting on the front and back of the variable elastic membrane 13 can have a phase difference. In the sound absorbing device 1 of the embodiment, the amplitude of the vibration of the variable elastic membrane 13 is amplified by the phase difference of the vibration pressure acting on the front and back of the variable elastic membrane 13.

In addition, the variable elastic membrane 13 can change the elastic modulus by the voltage adjustment part 30 as described above. Then, when the elastic modulus of the variable elastic membrane 13 of the other end portion 12*b* of the resonance tube 11 is reduced by the voltage adjustment part 30, a position of an antinode of the air column vibration in the resonance tube 11 virtually extends to the outer side (the side of the indoor space 10) of the actual position of the other end portion of the resonance tube 11. Accordingly, the frequency of the attenuated noise in the indoor space 10 can be reduced by decreasing the elastic modulus of the variable elastic membrane 13 using the voltage adjustment part 30. In addition, when the noise frequency of the attenuating target is the same, the pipeline length of the resonance tube 11 can be shortened.

In addition, when the elastic modulus of the variable elastic membrane 13 of the other end portion 12*b* of the resonance tube 11 is increased by the voltage adjustment part 30, the position of the antinode of the air column vibration in the resonance tube 11 virtually shrinks to the inner side of the actual position of the other end portion of the resonance tube 11 (the side separating away from the indoor space 10). Accordingly, by increasing the elastic modulus of the variable elastic membrane 13 using the voltage adjustment part 30, the frequency of the noise to be attenuated in the indoor space 10 can be increased.

In the above-mentioned configuration, when the elastic modulus of the variable elastic membrane 13 is set to a predetermined value by the voltage adjustment part 30, if the air in the indoor space 10 is vibrated by the noise input from the outside, the resonance tube 11 resonates with the vibrations of the predetermined frequency range of the air in the indoor space 10. Accordingly, the resonant vibration of the air in the resonance tube 11 interferes with the vibration (noise) of the predetermined frequency range in the indoor space 10 on the side of the one end portion 12*a* of the pipeline 12. Accordingly, energy of the vibration (noise) of the predetermined frequency range in the indoor space 10 is attenuated.

In addition, here, the variable elastic membrane 13 in which the front surface 13*a* faces the indoor space 10 receives the vibration of the air in the indoor space 10 and vibrates. Further, the vibration that reaches the other end portion 12*b* through an inner path of the pipeline 12 from the side of the one end portion 12*a* of the pipeline 12 of the resonance tube 11 hits the variable elastic membrane 13 on the side of the back surface 13*b*. Accordingly, the variable elastic membrane 13 receives vibrations on the front and back, and vibrates with an amplified large amplitude. Here, due to the internal friction of the variable elastic membrane 13, the vibration energy of the air in the indoor space 10 is greatly attenuated.

In the sound absorbing device 1 of the embodiment, a phase difference can be created between the vibration directly received by the front surface 13*a* of the variable elastic membrane 13 from the indoor space 10 and the vibration received by the back surface 13*b* of the variable elastic membrane 13 through the resonance tube 11, and the amplitude of the variable elastic membrane 13 can be amplified. For this reason, the noise of the indoor space 10 can be efficiently absorbed by an interference effect with respect to the vibration (noise) of the air of the predetermined frequency range by the resonance tube 11 and a vibration attenuation effect by the variable elastic membrane 13, the amplitude of which is amplified. Then, a large vibration attenuation effect by the variable elastic membrane 13 can be obtained without increasing the size of the variable elastic membrane 13.

Figure 3:
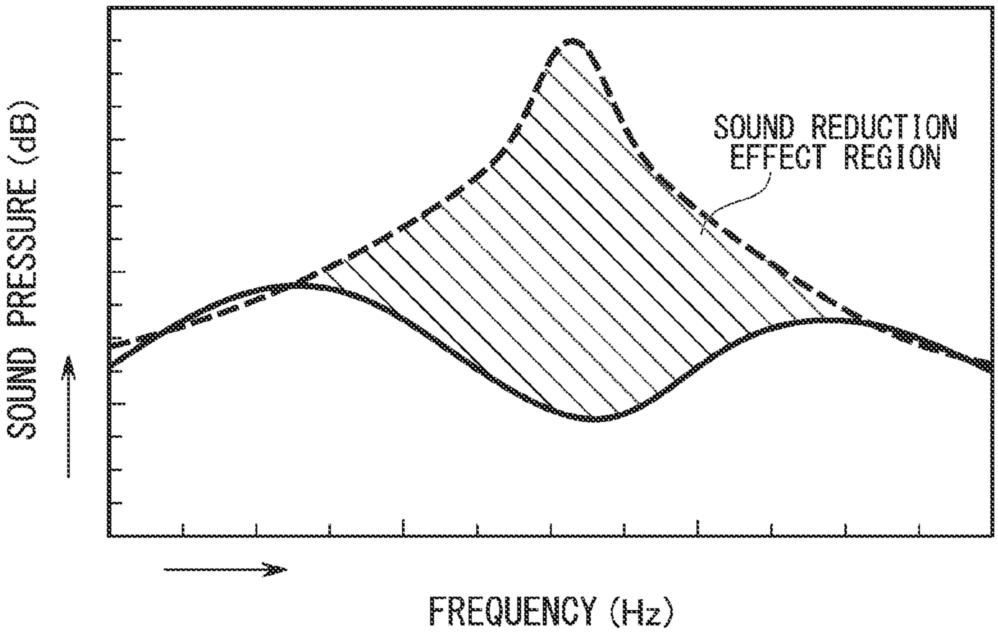
FIG. 3 is a sound pressure-frequency characteristic diagram showing a noise attenuation effect of the sound absorbing device of the embodiment of the present invention.

FIG. 3 is a sound pressure-frequency characteristic diagram showing a noise attenuation effect (noise reduction effect) when the sound absorbing device 1 of the embodiment is employed. A solid line in FIG. 3 is a characteristic diagram when the sound absorbing device 1 is employed, and a dotted line is a characteristic diagram when the sound absorbing device 1 is not employed.

As shown in the FIG. 3, when the sound absorbing device 1 of the embodiment is employed, the noise of the indoor space 10 in the frequency range (about 340 Hz to 370 Hz) can be largely reduced.

Accordingly, when the sound absorbing device 1 of the embodiment is employed, it is possible to efficiently absorb the noise of the indoor space 10 without increasing the size and weight of the equipment, and achieve the improvement of quietness and energy efficiency of the vehicle.

In addition, the sound absorbing device 1 of the embodiment is formed such that the opening area in the other end portion 12*b* of the pipeline 12 of the resonance tube 11 is gradually increased toward the variable elastic membrane 13. For this reason, fluctuations in pressure in the in-plane direction on the back surface of the variable elastic membrane 13 due to rapid expansion of the pipeline end of the resonance tube 11 facing the back surface 13*b* of the variable elastic membrane 13 can be suppressed. Accordingly, when this configuration is employed, it is possible to suppress reduction of a sound absorption effect by the sound absorbing device 1.

In addition, in the sound absorbing device 1 of the embodiment, the vibration membrane disposed on the other end portion of the resonance tube is constituted by the variable elastic membrane 13, and elasticity of the variable elastic membrane 13 can be adjusted by the voltage adjustment part 30. For this reason, by lowering the elastic modulus of the variable elastic membrane 13 using the voltage adjustment part 30, noise in the low frequency range can be reduced without lengthening the actual pipeline length of the resonance tube 11. Accordingly, when the sound absorbing device 1 of the embodiment is employed, it is possible to achieve further miniaturization and weight reduction of the device while efficiently absorbing the noise in the indoor space 10.

Figure 4:
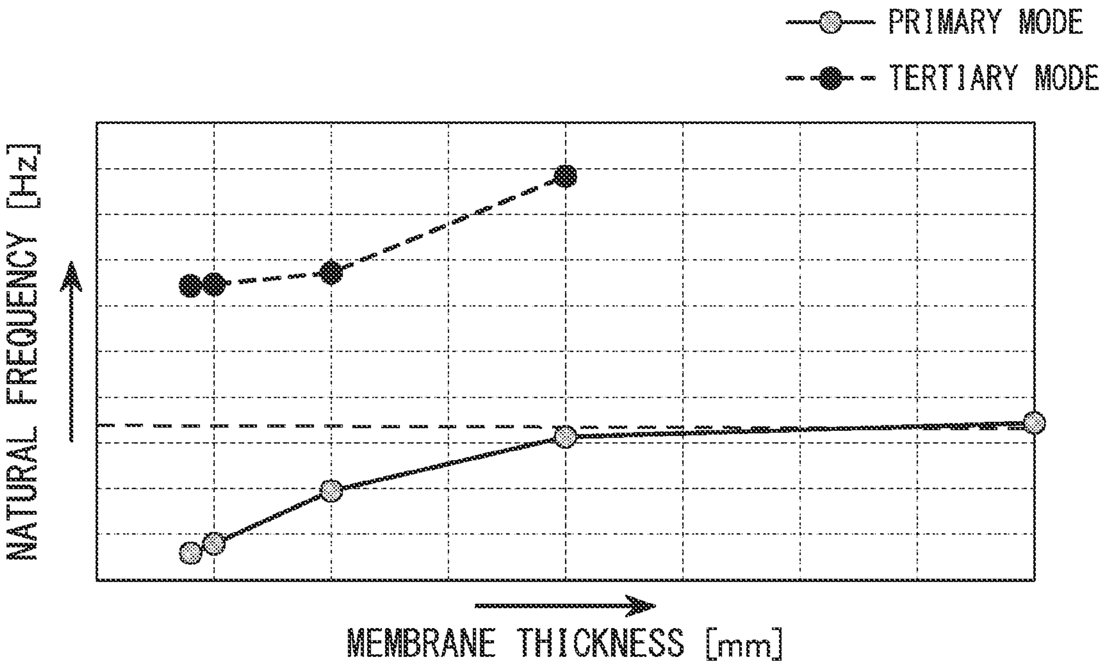
FIG. 4 is a characteristic diagram showing a relation between a membrane thickness of a variable elastic membrane and a natural frequency (resonant frequency) of a resonance tube.

FIG. 4 is a characteristic diagram showing a relation between a membrane thickness of the variable elastic membrane 13 and a natural frequency (resonant frequency) of the resonance tube 11.

As shown in FIG. 4, when the membrane thickness of the variable elastic membrane 13 is reduced, both a primary mode vibration (basic vibration) and a tertiary mode vibration (triple vibration) of the resonance tube 11 decrease.

Accordingly, when the sound absorbing device of the embodiment is employed, the noise in the indoor space 10 can be efficiently absorbed without extending the actual pipeline length of the resonance tube 11.

Further, the sound absorbing device 1 of the embodiment includes the frequency detection part 35 configured to detect a frequency of noise, and the voltage adjustment part 30 increases or decreases the elastic modulus of the variable elastic membrane 13 according to the frequency of the noise detected by the frequency detection part 35. For this reason, an absorbable frequency range can be changed according to the actual noise frequency. Accordingly, when this configuration is employed, it is possible to absorb a wide frequency range of noise depending on the noise generated.

Specifically, in the voltage adjustment part 30 of the sound absorbing device 1, the elastic modulus of the variable elastic membrane 13 is increased as the frequency of the noise detected by the frequency detection part 35 is increased, and the elastic modulus of the variable elastic membrane 13 is reduced as the frequency of the noise detected by the frequency detection part 35 is lowered. For this reason, depending on the frequency of the noise detected by the frequency detection part 35, the elastic modulus of the variable elastic membrane 13 can be set to the optimum elastic modulus that can absorb sound. Accordingly, when this configuration is employed, a wide frequency range of noise can be accurately absorbed.

In addition, in the sound absorbing device 1 of the embodiment, the variable elastic membrane 13 is formed by a material capable of increasing or decreasing a membrane thickness by receiving a stimulus (voltage) from the outside, such as a piezoelectric film (polymer ferroelectric film), piezoelectric ceramics (lead zirconate titanate), or the like. In the variable elastic membrane 13, a membrane thickness is increased or decreased by the voltage applied through the voltage adjustment part 30, and as a result, the elastic modulus is increased or decreased. Accordingly, when this configuration is employed, it is possible to appropriately set the elastic modulus of the variable elastic membrane 13 and absorb the noise well in the frequency range of the sound-absorbing target.

Further, here, while the piezoelectric film (polymer ferroelectric film) or the piezoelectric ceramics (lead zirconate titanate) in which a membrane thickness of which are changed according to the applied voltage, are exemplified as the variable elastic membrane 13, the variable elastic membrane 13 is not limited thereto. For example, a polymer membrane or the like that can be electrically charged on the front and back may be used, and the thickness of the membrane may be increased or decreased by adjusting the amount of the electric charge charged on the front and back. In this case, the electric charge is an external stimulus for increasing or decreasing the membrane thickness.

Second Embodiment

Figure 5:
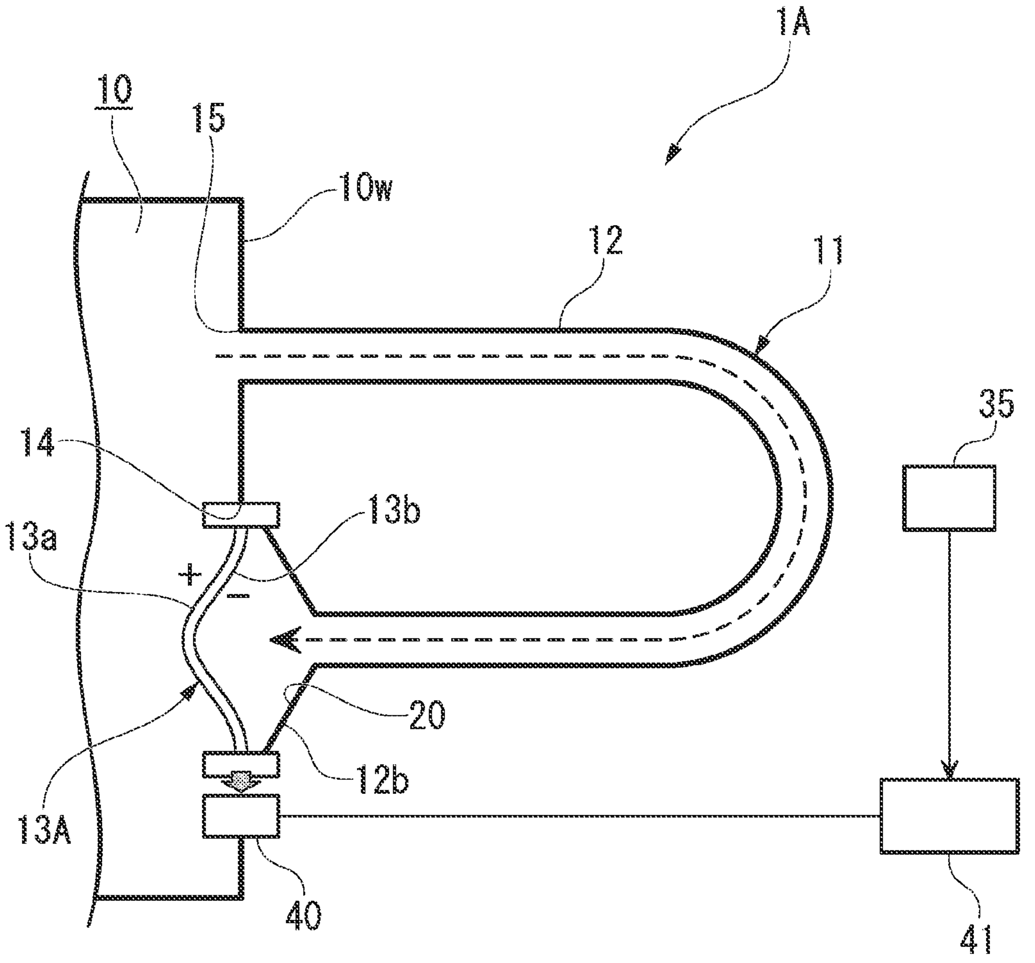
FIG. 5 is a schematic configuration view of a sound absorbing device of a second embodiment of the present invention.

FIG. 5 is a schematic configuration view of a sound absorbing device 1A of an embodiment.

In the sound absorbing device 1A of the embodiment, while a basic configuration of the resonance tube 11 or the like is the same as that in the first embodiment, configurations of a variable elastic membrane 13A and an adjustment part configured to increase or decrease an elastic modulus of the variable elastic membrane 13A are different from those in the first embodiment.

The variable elastic membrane 13A of the embodiment is formed by a membrane member configured to increase or decrease a membrane thickness by receiving a stretching force in a direction perpendicular to the membrane thickness from the outside. For example, the membrane member is formed by a polymer membrane. In addition, the adjustment part of the embodiment is constituted by an expansion/contraction device 40 configured to apply a stretching force in a direction perpendicular to the membrane thickness to the variable elastic membrane 13A. The expansion/contraction device 40 is not particularly limited in the structure as long as it can adjust the tension imparted to the variable elastic membrane 13A. The expansion/contraction device 40 can be configured by, for example, an electromagnetic actuator or the like.

In the embodiment, the elastic modulus of the variable elastic membrane 13A is increased by increasing the tension of the variable elastic membrane 13A, and the elastic modulus of the variable elastic membrane 13A is decreased by reducing the tension of the variable elastic membrane 13A.

In addition, the expansion/contraction device 40 is controlled by a controller 41. The frequency detection part 35 configured to detect a frequency of the noise in the indoor space 10 is connected to the controller 41. The controller 41 receives a detection signal of the frequency detection part 35 and adjusts the elastic modulus of the variable elastic membrane 13A to a value according to the detection signal.

Although the sound absorbing device 1A of the embodiment differs in this configuration of the variable elastic membrane 13A and the adjustment part (the expansion/contraction device 40), the rest of the basic configuration is almost the same as the first embodiment. For this reason, the sound absorbing device 1A of the embodiment can obtain substantially the same effect as the first embodiment described above.

However, the sound absorbing device 1A of the embodiment is constituted by the expansion/contraction device 40 having an adjustment part configured to physically impart a force to the variable elastic membrane 13A. For this reason, even if the variable elastic membrane 13A is made of an easily available and inexpensive material, the elastic modulus of the variable elastic membrane 13A can be adjusted appropriately. However, when this configuration is employed, product costs of the sound absorbing device 1A can be reduced.

Third Embodiment

Figure 6:
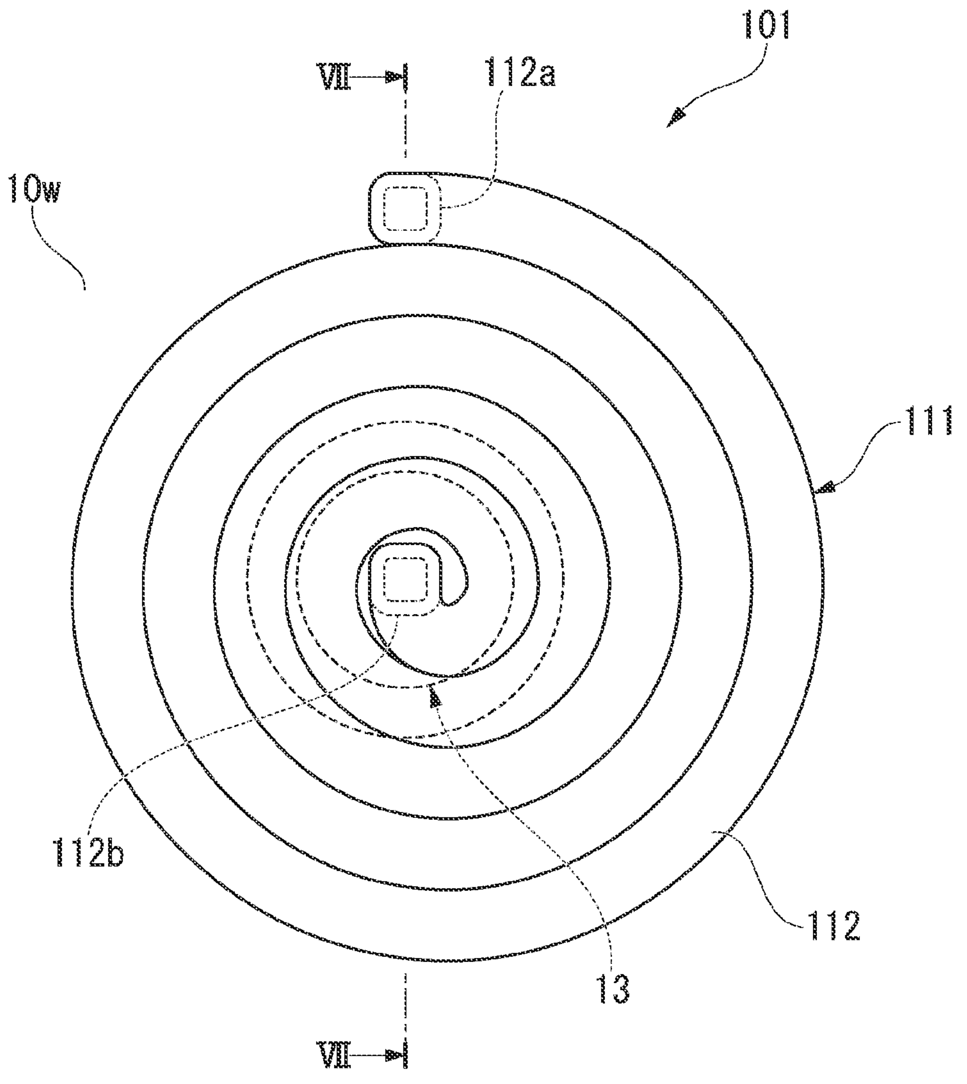
FIG. 6 is a front view of a sound absorbing device of a third embodiment of the present invention.
Figure 7:
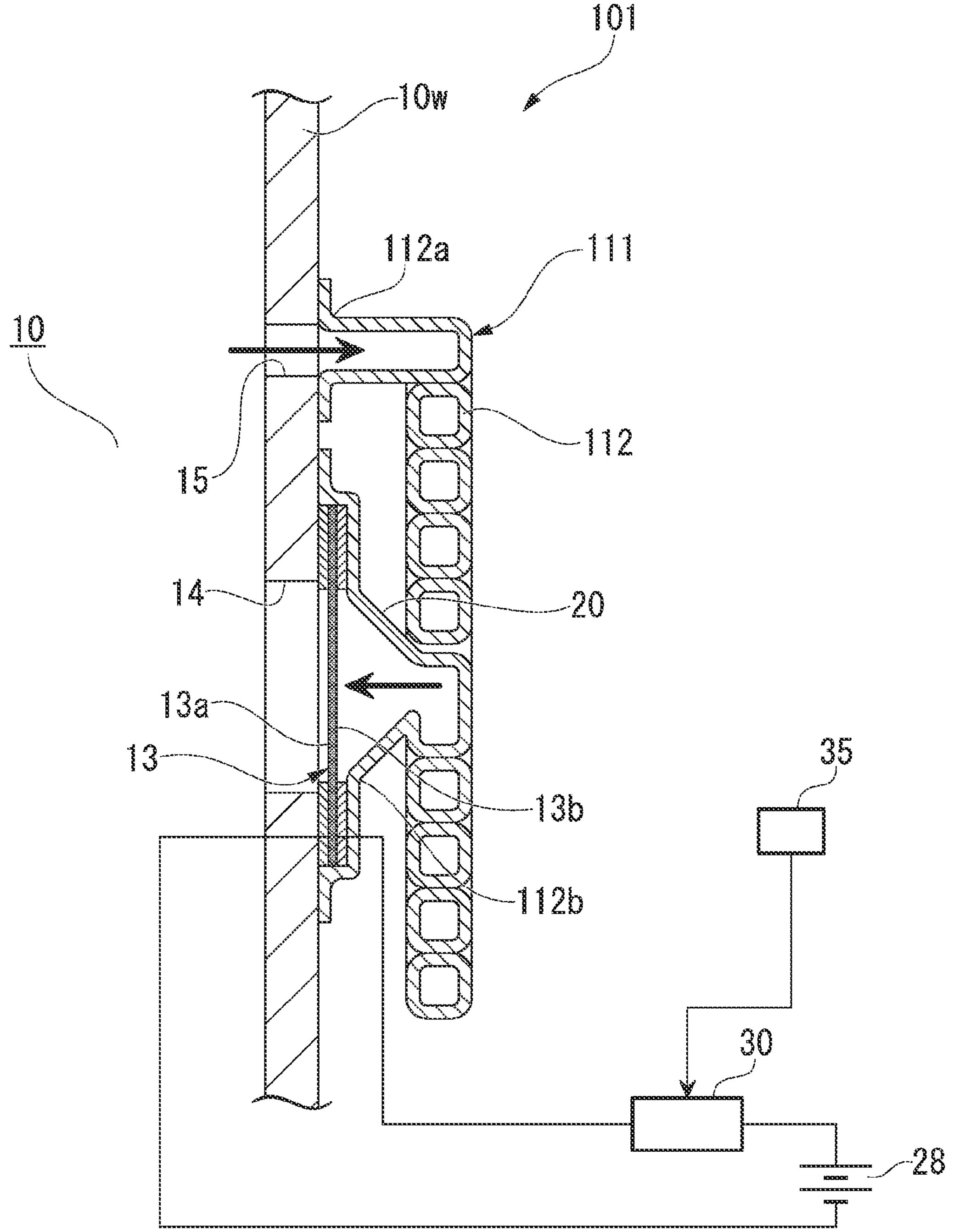
FIG. 7 is a cross-sectional view of the sound absorbing device of the third embodiment of the present invention along line VII-VII of FIG. 6.

FIG. 6 is a front view of a sound absorbing device 101 of an embodiment (a view seen from an outer side of the wall 10*w* of the indoor space 10), and FIG. 7 is a cross-sectional view of the sound absorbing device 101 along line VH-VH in FIG. 6.

Like the above-mentioned embodiments, the communication ports 14 and 15 are provided on the wall 10*w* of the indoor space 10. The variable elastic membrane 13 having a circular shape is attached to an outer circumferential edge portion of the one communication port 14. An effective vibration area of the variable elastic membrane 13 has substantially the same size as an inner diameter of the communication port 14. One end portion 112*a* of a pipeline 112 of the resonance tube 111 is connected to the other communication port 15.

The variable elastic membrane 13, which is the same as in the first embodiment, is used. In addition, the voltage adjustment part 30 configured to increase or decrease the elastic modulus of the variable elastic membrane 13 adjusts the voltage according to the detection signal of the frequency detection part 35, like the first embodiment. However, the variable elastic membrane or the adjustment part, which is the same as in the second embodiment, may also be used.

As shown in FIG. 7, the pipeline 112 of the resonance tube 111 of the embodiment is formed to have an almost square-shaped cross section. Then, the pipeline 112 of the resonance tube 111 is formed in a vortex shape in which the side of the other end portion 112*b* is set as a vortex center. The variable elastic membrane 13 having a circular shape is disposed such that a center of the membrane surface substantially matches with the vortex center of the resonance tube 111. The resonance tube 111 of the embodiment is formed such that an inner circumferential surface of a pipeline portion of an outer layer comes into contact with an outer circumferential surface of a pipeline portion of an inner layer of the pipeline 112 that goes round in a vortex shape. For this reason, the pipeline 112 of the resonance tube 111 of the embodiment is formed in a block shape having a disk shape with a predetermined thickness entirely.

However, the one end portion 112*a* and the other end portion 112*b* of the pipeline 112 of the resonance tube 11 extend to be bent from a block-shaped part having a disk shape in a direction of the wall 10*w* of the indoor space 10. Like the above-mentioned embodiments, the tapered portion 20, an internal opening area of which is gradually increased toward a direction of the communication port 14, is formed on the other end portion 112*b* of the pipeline 112.

Since the sound absorbing device 101 of the embodiment has the same basic configuration as in the above-mentioned embodiment, the same basic effects as in the above-mentioned embodiment can be obtained.

In addition, in the sound absorbing device 101 of the embodiment, since the resonance tube 111 is formed in a vortex shape using the other end portion 112*b* of the pipeline 112 as a vortex center, a sufficient pipeline length of the resonance tube 111 can be secured while suppressing an increase in the occupied space of the resonance tube 111.

Further, while the resonance tube 111 is formed in a vortex shape using the side of the other end portion 112*b* of the pipeline 112 (the side of the communication port 14) as a vortex center in the embodiment, the resonance tube 111 may have a vortex shape using the side of the one end portion 112*a* of the pipeline 112 (the side of the communication port 15) as a vortex center.

However, like the embodiment, when the resonance tube 111 is formed in a vortex shape using the other end portion 112*b* of the pipeline 112 as a vortex center, the variable elastic membrane 13 having a disk shape is disposed at a position where a center of the membrane surface matches with a center of the resonance tube 111, and thus, the resonance tube 111 and the variable elastic membrane 13 can be arranged compactly. Accordingly, when this configuration is employed, the entire sound absorbing device 101 can be made smaller.

In addition, in the above-mentioned example, while the resonance tube 111 is formed such that the inner circumferential surface of the pipeline portion of the outer layer comes into contact with the outer circumferential surface of the pipeline portion of the inner layer of the pipeline 112 that goes round in a vortex manner, the pipeline 112 may have a spiral shape which turns while having a gap.

Fourth Embodiment

Figure 8:
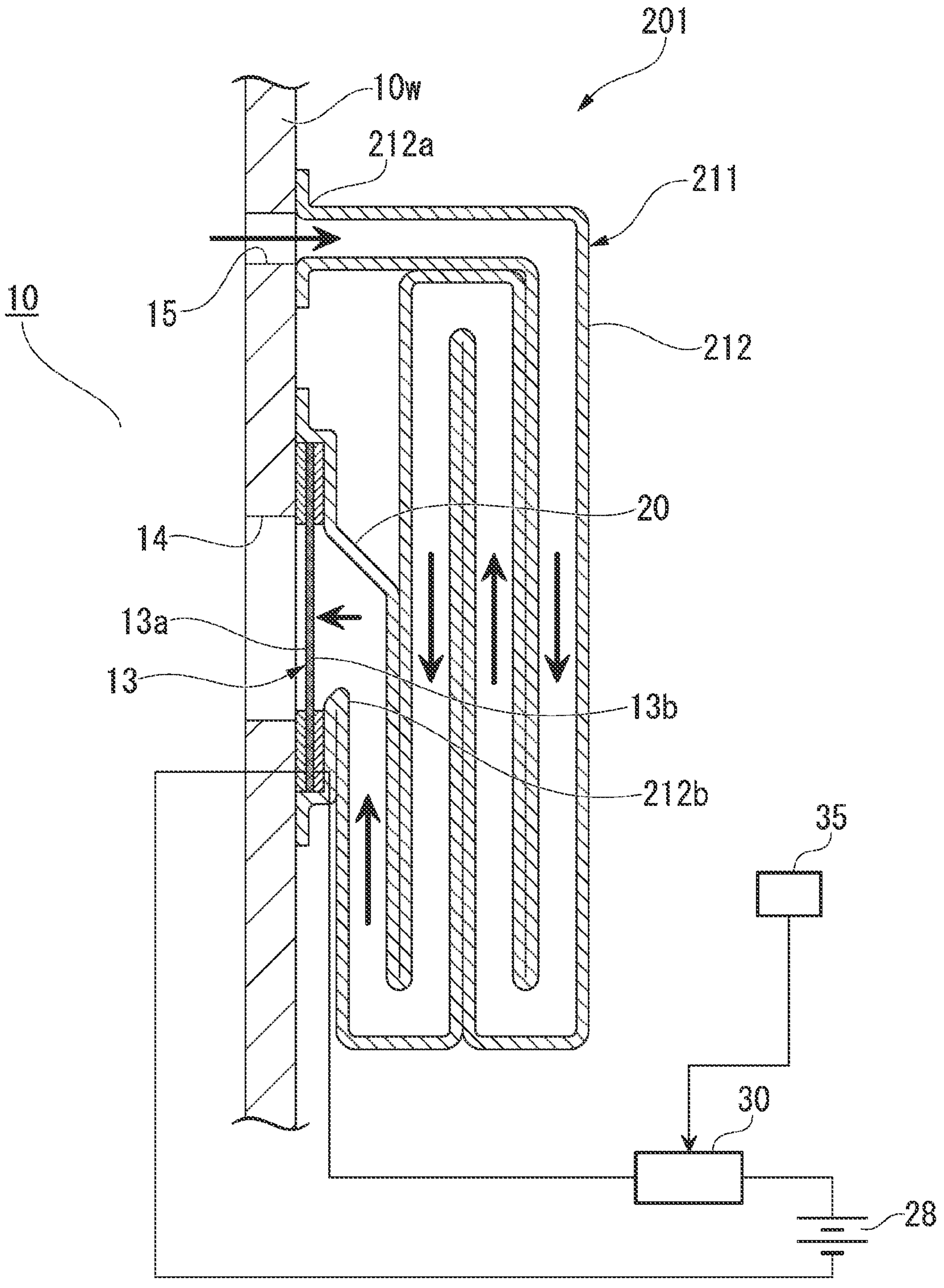
FIG. 8 is a cross-sectional view of a sound absorbing device of a fourth embodiment of the present invention, which is similar as FIG. 7.

FIG. 8 is a cross-sectional view of a sound absorbing device 201 of an embodiment, which is the same as FIG. 7 of the third embodiment.

Like each of the above-mentioned embodiments, the communication ports 14 and 15 are provided on the wall 10*w* of the indoor space 10. The variable elastic membrane 13 having a circular shape is attached to an outer circumferential edge portion of the communication port 14, and a resonance tube 211 is connected to the other communication port 15 on the side of one end portion 212*a* of a pipeline 212. The effective vibration area of the variable elastic membrane 13 has substantially the same size as the inner diameter of the communication port 14.

The variable elastic membrane 13, which is the same as in the first embodiment, is used. In addition, like the first embodiment, the voltage adjustment part 30 is adjusted according to the detection signal of the frequency detection part 35. However, the variable elastic membrane or the adjustment part, which is the same as in the second embodiment, may also be used.

The pipeline 212 of the resonance tube 211 of the embodiment is formed in a substantially rectangular cross-sectional shape, in which two sides parallel to each other are longer than the remaining two sides. In the resonance tube 211, a portion between the one end portion 212*a* and the other end portion 212*b* is formed in a folding shape (meandering shape) such that the main part of the pipeline 212 folds on the short side of the cross section of the pipeline 212. Specifically, in the example shown in FIG. 8, the pipeline 212 of the resonance tube 211 is formed in a substantially rectangular cross-sectional shape of the drawing, a side in a depth direction of which is a long side, and the main part of the pipeline 212 except the one end portion 212*a* is folded up and down a plurality of times so as to be folded on the short side of the cross section.

The resonance tube 211 of the embodiment has a shape in which the pipeline 212 having a relatively long pipeline width is folded up and down a plurality of times on an outer side of the wall 10*w* of the indoor space 10. The midpoints of the pipeline 212, which has been folded back a plurality of times, are in contact with each other over almost the entire pipeline width. For this reason, the pipeline 212 of the resonance tube 211 of the embodiment has a rectangular block shape as a whole.

Further, like each of the above-mentioned embodiments, the tapered portion 20, an internal opening area of which is gradually increased in a direction of the communication port 14, is formed on the other end portion 212*b* of the pipeline 212.

Since the sound absorbing device 201 of the embodiment has the same basic configuration as each of the above embodiments, the same basic effects as those of each of the above embodiments can be obtained.

In addition, in the sound absorbing device 201 of the embodiment, the pipeline 212 of the resonance tube 211 having a relatively long pipeline width is folded up and down a plurality of times. For this reason, suppression of an increase in the occupied space of the resonance tube 211 and securing of a sufficient pipeline length of the resonance tube 211 can be achieved while sufficiently securing the pipeline width of the resonance tube 211. Accordingly, when the sound absorbing device 201 having the above-mentioned configuration is employed, a sufficient pipeline width of the resonance tube 211 can attenuate noise vibration in a wider frequency range while suppressing an increase in size and weight of the entire device.

Further, while the pipeline 212 is formed in a substantially rectangular cross-sectional shape in the fourth embodiment, the cross-sectional shape of the pipeline 212 may be a shape other than the substantially rectangular shape. In addition, the pipeline 212 may simply meander between the one end portion 212*a* and the other end portion 212*b*.

Fifth Embodiment

Figure 9:
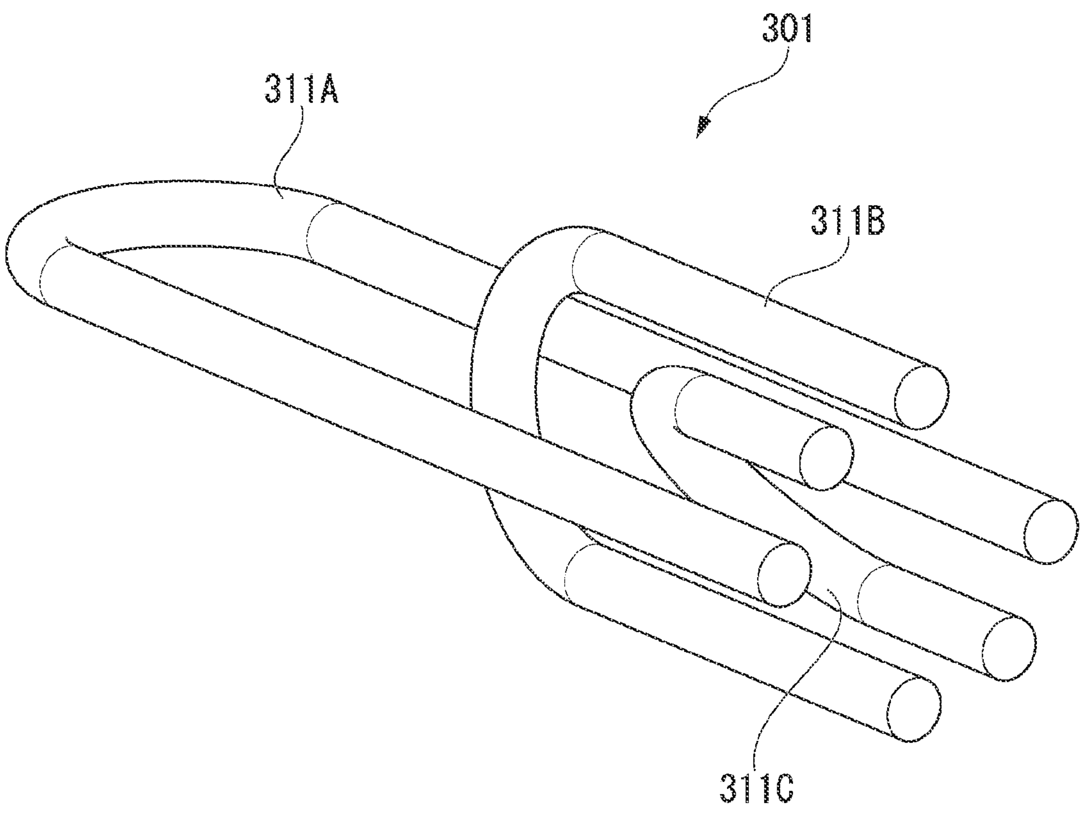
FIG. 9 is a perspective view showing a part of a sound absorbing device of a fifth embodiment of the present invention.

FIG. 9 is a perspective view showing a part of a sound absorbing device 301 of an embodiment.

While the sound absorbing device 1 (1A, 101, 201) of each of the embodiments has only one resonance tube 11 (111, 211) provided on the wall 10*w* of the indoor space 10, the sound absorbing device 301 of the embodiment includes a plurality of resonance tubes 311A, 311B and 311C having different lengths. Each of the resonance tubes 311A, 311B and 311C is provided on the wall of the indoor space, like the above-mentioned embodiment. In addition, the same variable elastic membrane (not shown) as in each of the above-mentioned embodiments is attached to the other end portion of each of the resonance tubes 311A, 311B and 311C.

The resonance tube 311A having the largest pipeline length is set to have a natural frequency that resonates with the vibration (basic vibration) of the primary mode of the noise of the attenuating target. The resonance tube 311A resonates not only with the primary mode vibration (basic vibration), but also with the tertiary mode vibration (triple vibration) and the fifth mode vibration (5 times vibration), and these frequency vibrations can also be attenuated.

On the other hand, the resonance tube 311B, which has the next longest length, is set to have a natural frequency that resonates with the double vibration of the basic vibration of the resonance tube 311A, and the shortest resonance tube 311C is set to have a natural frequency that resonates with the quadruple vibration of the basic vibration of the resonance tube 311A.

Since the sound absorbing device 301 of the embodiment has the same configuration as in the above-mentioned first or second embodiment, the same basic effects as in these embodiments can be obtained.

However, since the sound absorbing device 301 of the embodiment includes the plurality of resonance tubes 311A, 311B and 311C having different lengths, it is possible to accurately absorb noise in various frequency ranges. In particular, like the embodiment, when the resonance tube 311B having a natural frequency that resonates with double vibration of the natural frequency of the one resonance tube 311A and the resonance tube 311C having a natural frequency that resonates with quadruple vibration are provided, it is possible to effectively attenuate the vibration of continuous order components such as primary, secondary, tertiary, and so on. For this reason, it is possible to effectively absorb noise even for vibration of a rotating system such as a propeller that tends to generate noise of the continuous order components.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A sound absorbing device for a moving body comprising:

a resonance tube having a pipeline, in which one end portion of the pipeline is disposed to face an indoor space;

a variable elastic membrane in which one surface is disposed so as to face the indoor space and in which another surface is disposed so as to face an internal space of another end portion of the resonance tube; and an adjustment part configured to adjust an elastic modulus of the variable elastic membrane, the pipeline comprises a tapered portion in which an opening area of an inside of the other end portion of the resonance tube is gradually increased toward the variable elastic membrane.

2. The sound absorbing device for a moving body according to claim 1, further comprising a frequency detection part configured to detect a frequency of noise, wherein the adjustment part increases or decreases the elastic modulus of the variable elastic membrane according to the frequency of the noise detected by the frequency detection part.

3. The sound absorbing device for a moving body according to claim 2, wherein the adjustment part increases the elastic modulus of the variable elastic membrane as the frequency of the noise detected by the frequency detection part increases, and decreases the elastic modulus of the variable elastic membrane as the frequency of the noise detected by the frequency detection part decreases.

4. The sound absorbing device for a moving body according to claim 1, wherein the variable elastic membrane is formed of a material capable of adjusting a membrane thickness according to a stimulus from outside, and the adjustment part is configured to apply a stimulus to the variable elastic membrane that increases or decreases a membrane thickness.

5. The sound absorbing device for a moving body according to claim 1, wherein the adjustment part is constituted by an expansion/contraction device configured to apply a force in an expansion/contraction direction which increases or decreases tension of the variable elastic membrane.

6. The sound absorbing device for a moving body according to claim 1, comprising a plurality of the resonance tubes having different lengths, wherein the respective variable elastic membrane and the respective adjustment part corresponding to each of the resonance tubes are provided.

7. The sound absorbing device for a moving body according to claim 1, wherein the other end portion of the resonance tube also is disposed so as to face the indoor space.

8. The sound absorbing device for a moving body according to claim 1, wherein the variable elastic membrane is arranged to be adjustable into the indoor space.

* * * * *